(12) United States Patent
Tian

(10) Patent No.: US 10,307,799 B2
(45) Date of Patent: Jun. 4, 2019

(54) APPARATUS FOR DISMANTLING AND CLEANING A DISPLAY PANEL

(71) Applicants: BOE Technology Group Co., Ltd., Beijing (CN); Hefei BOE Optoelectronics Technology Co., Ltd., Anhui (CN)

(72) Inventor: Wei Tian, Beijing (CN)

(73) Assignees: BOE Technology Group Co., Ltd., Beijing (CN); Hefei BOE Optoelectronics Technology Co., Ltd., Hefei (CN)

(*) Notice: Subject to any disclaimer, the term of this patent is extended or adjusted under 35 U.S.C. 154(b) by 476 days.

(21) Appl. No.: 15/097,526

(22) Filed: Apr. 13, 2016

(65) Prior Publication Data

US 2017/0059895 A1     Mar. 2, 2017

(30) Foreign Application Priority Data

Sep. 1, 2015   (CN) .......................... 2015 1 0552024

(51) Int. Cl.
 *B08B 3/10* (2006.01)
 *G02F 1/13* (2006.01)
 (Continued)

(52) U.S. Cl.
 CPC .................. *B08B 3/10* (2013.01); *B08B 3/02* (2013.01); *B26D 3/28* (2013.01); *B26D 7/08* (2013.01);
 (Continued)

(58) Field of Classification Search
 CPC .......... G02F 1/1303; B08B 3/02; B08B 3/10; B26D 3/28; B26D 7/08
 See application file for complete search history.

(56) References Cited

U.S. PATENT DOCUMENTS

| 9,082,454 B2* | 7/2015 | Yao ........................... B08B 3/02 |
| 2002/0102155 A1* | 8/2002 | Wu .......................... B25J 9/042 |
| | | 414/744.5 |

(Continued)

FOREIGN PATENT DOCUMENTS

| CN | 203390908 U | 1/2014 |
| CN | 204234447 U | 4/2015 |

(Continued)

OTHER PUBLICATIONS

Machine translation of CN-204234447-U, dated Apr. 2015. (Year: 2015).*

(Continued)

*Primary Examiner* — Joseph L. Perrin
*Assistant Examiner* — Kevin G Lee
(74) *Attorney, Agent, or Firm* — Banner & Witcoff, Ltd.

(57) ABSTRACT

An apparatus for dismantling and cleaning includes a housing; a heating device for heating an object for dismantling and cleaning is provided in the housing; a movable mechanical arm device is provided in the housing, a pick-up device is provided on the mechanical arm device, and the pick-up device is configured to pick up the object for dismantling and cleaning; and a spray device configured to spray cleaning liquid and a drying device configured to dry an interior of the housing are provided within the housing.

16 Claims, 4 Drawing Sheets

(51) Int. Cl.
  *B08B 3/02* (2006.01)
  *B26D 7/08* (2006.01)
  *B26D 3/28* (2006.01)
(52) U.S. Cl.
  CPC .... *G02F 1/1303* (2013.01); *G02F 2001/1316* (2013.01)

(56) References Cited

U.S. PATENT DOCUMENTS

2002/0111103 A1* 8/2002 Konishi .................. H01J 9/261
                                                              445/25
2005/0236114 A1* 10/2005 Yanagita ........... H01L 21/67092
                                                              156/751
2010/0084093 A1* 4/2010 Li ..................... H01L 21/67011
                                                              156/703

FOREIGN PATENT DOCUMENTS

CN            204546443 U      8/2015
JP          2012083659 A   *   4/2012  ........... C03B 33/074

OTHER PUBLICATIONS

Machine translation of JP-2012083659-A, dated Apr. 2012. (Year: 2012).*

Jun. 28, 2017—(CN) First Office Action Appn 201510552024.2 with English Tran.

* cited by examiner

APPARATUS FOR DISMANTLING AND CLEANING A DISPLAY PANEL

This application claims priority to and the benefit of Chinese Patent Application No. 201510552024.2 filed on Sep. 1, 2015, which application is incorporated herein in its entirety.

TECHNICAL FIELD

Embodiments of present disclosure relate to an apparatus for dismantling and cleaning a display panel.

BACKGROUND

With the development of electronic information techniques, television sets, computers, cell phones and similar display devices have already become a part of people's daily lives, and a display panel in a display device belongs to one of the important components for achieving a display function of the display device. Due to further requirements for greater view angle area, better colorization, less electromagnetic radiation and similar aspects of the display panel from users, manufacture processes and manufacture techniques for the display panel are also continuously updated.

Due to increased difficulties of the manufacture processes and more complicated techniques for the display panel, it is hard to avoid occurrences of various defects during a fabrication procedure of the display panel, thus reducing a yield rate of the display panel. In order to determine a reason for the defect of the display panel, it is required to dismantle and clean the imperfect display panel produced during the fabrication procedure, to get a color filter substrate and an array substrate, so that a reason for the defect of the display panel is obtained by checking on the color filter substrate and the array substrate.

SUMMARY

An embodiment of present disclosure provides an apparatus for dismantling and cleaning, comprising a housing; a heating device for heating an object for dismantling and cleaning is provided in the housing; a movable mechanical arm device is provided in the housing, a pick-up device is provided on the mechanical arm device, and the pick-up device is configured to pick up the object for dismantling and cleaning; and a spray device configured to spray cleaning liquid and a drying device configured to dry an interior of the housing are provided within the housing.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

Figure 1:
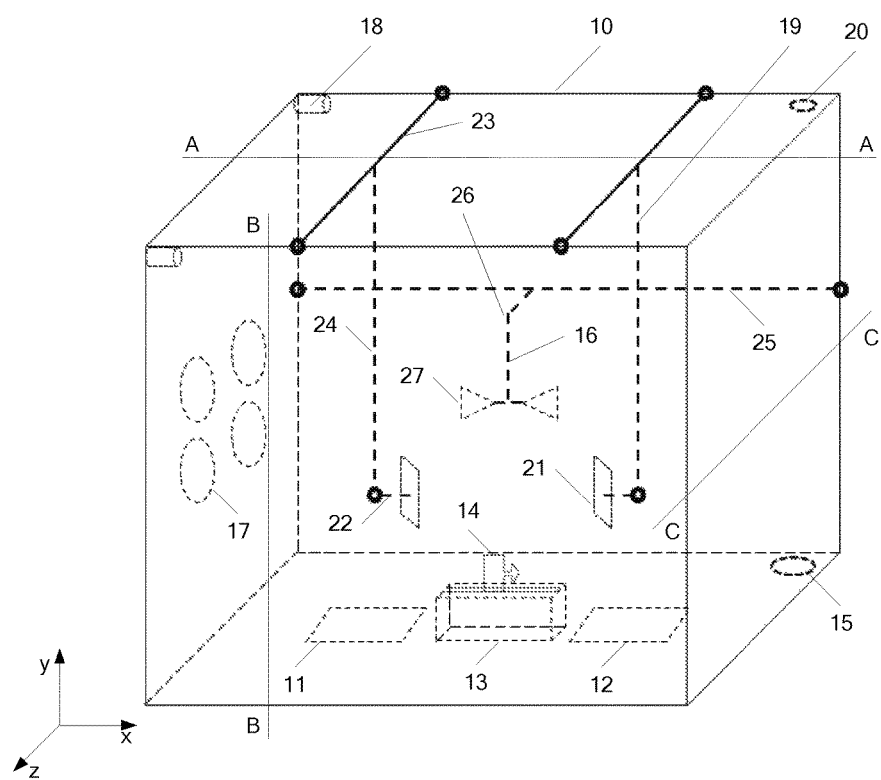
FIG. 1 is a structural schematic view of an apparatus for dismantling and cleaning a display panel according to an embodiment of present disclosure.
Figure 2:
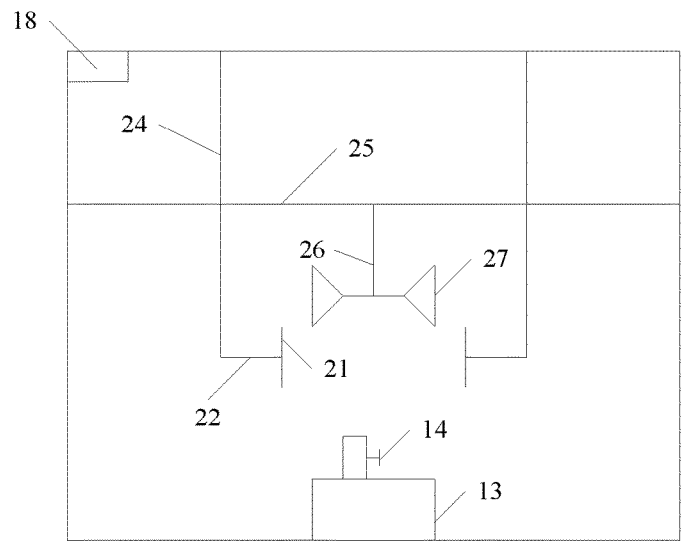
FIG. 2 is an A-A sectional view of the apparatus for dismantling and cleaning the display panel according to the embodiment of present disclosure.
Figure 3:
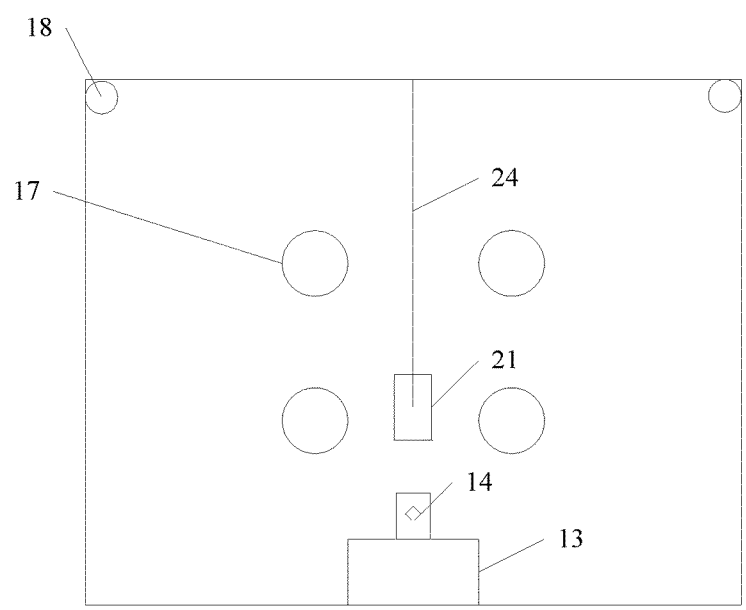
FIG. 3 is a B-B sectional view of the apparatus for dismantling and cleaning the display panel according to the embodiment of present disclosure.
Figure 4:
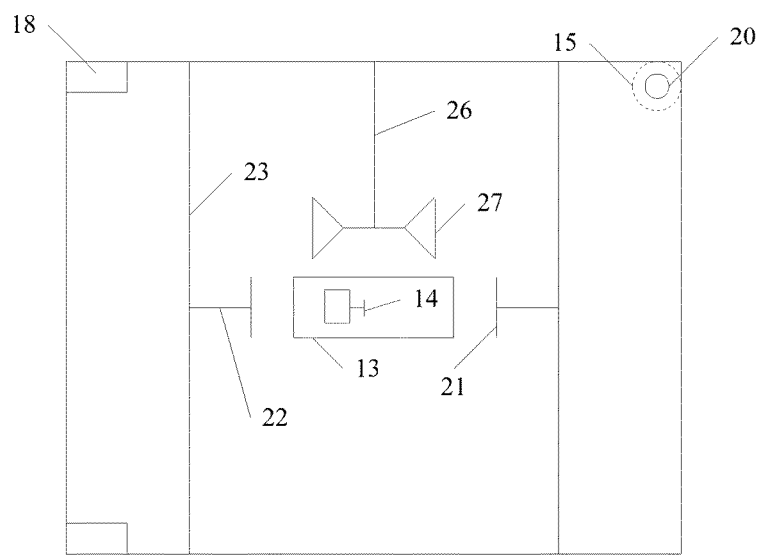
FIG. 4 is a C-C sectional view of the apparatus for dismantling and cleaning the display panel according to the embodiment of present disclosure.

10—housing, 11—first panel placement zone, 12—second panel placement zone, 13—heating device, 14—dismantling blade, 15—drain port, 16—spray device, 17—drying device, 18—feed pipe, 19—mechanical arm mechanism, 20—exhaust device, 21—suction device, 22—rotating arm, 23—sliding arm, 24—telescopic arm, 25—lifting lever, 26—connecting rod, 27—nozzle, 28—sealant

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Generally, dismantling and cleaning of the display panel are performed manually by operators. During a manually dismantling process, the operators need to employ tools, such as hot air guns, a dismantling blade and the like, and also during a manually cleaning process, the operators will also frequently contact toxic liquid crystal. The above-mentioned hot air guns, the dismantling blade and similar tools as well as the toxic liquid crystal are likely to bring damages to the operators.

The embodiment of the invention provides an apparatus for dismantling and cleaning for a display panel so that a display panel or the like can be dismantled and cleaned. The display panel may be a liquid display panel and an organic light-emitting diode (OLED) display panel. A liquid display panel may include an array substrate and an opposite substrate that is disposed opposite to the array substrate. A cell is formed by combining the array substrate and the opposite substrate with sealant. Liquid material is provided in the cell between the array substrate and the opposite substrate. The opposite substrate may be a color filter substrate, for example. An OLED display panel may include an array substrate provided with OLED units, and a sealing substrate that is disposed opposite to the array substrate. The array substrate and the sealing substrate may be combined with sealant.

The embodiment of present disclosure provides an apparatus for dismantling and cleaning. The apparatus includes a housing. A first panel placement zone, a second panel placement zone, a heating device, a dismantling blade, a drying device, mechanical arm devices and pick-up devices (for example, suction devices) are provided within the housing. Further, a liquid collecting device may be provided within the housing, or the housing may include a drain port. The suction device may collect (for example, adsorb) the display panel, the mechanical arm device moves the display panel in a suitable place. The heating device softens the sealant in the display panel by a high temperature. The dismantling blade dismantles the display panel into a color filter substrate and an array substrate. A spray device sprays cleaning liquid toward the dismantled color filter substrate and array substrate, so as to clean off the liquid crystal on the color filter substrate and the array substrate. A drying device allows for drying an interior of the housing. Wasted liquid generated during a cleaning process may be collected by the liquid collecting device, or may be discharged out of the housing through the drain port provided on the housing. The dismantling blade is provided the heating device for example, but the embodiment of the present disclosure is not limited thereto.

A detailed description will be made in conjunction with FIGS. 1, 2, 3 and 4. The embodiment of present disclosure provides an apparatus for dismantling and cleaning a display panel. The apparatus includes a housing 10. A first panel placement zone 11, a second panel placement zone 12 and a heating device 13 for softening sealant in the display panel are provided on a bottom in the housing 10 for example. A dismantling blade 14 for dismantling the display panel is provided on the heating device 13. Two movable mechanical arm devices 19 are provided within the housing 10. Suction devices 21 for adsorbing the display panel, the dismantled color filter substrate or array substrate are provided on the movable mechanical arm devices 19. A spray device 16 for spraying cleaning liquid and a drying device 17 for drying the interior of the housing 10 are provided within the housing 10. A drain port 15 is provided on the bottom of housing 10. In embodiments of the present disclosure, a movable mechanical arm device may be provided in the housing for moving or holding the display panel as an object for dismantling and cleaning, alternatively two or more movable mechanical arm devices may be provided in the housing for example. For example, object for dismantling and cleaning is a display panel, an array substrate after dismantling, or a color filter substrate after dismantling.

In the following, a specific method of using the above-mentioned apparatus for dismantling and cleaning a display panel will be illustrated in conjunction with a structure of the above-mentioned apparatus for dismantling and cleaning the display panel (taking two mechanical arm devices 19 being provided in the housing 10 as an example, but the present disclosure is not limited thereto).

The display panel before dismantling (i.e., the display panel that requires to be dismantled) is horizontally placed at the first panel placement zone 11 or the second panel placement zone 12. The mechanical arm device 19 is initialized, so that the mechanical arm device 19 moves till above the display panel, and adsorbs the display panel by means of the suction device 21 on the mechanical arm device 19. The suction devices 21 on the two mechanical arm devices 19 respectively adsorb two surfaces of the display panel. That is, the suction device 21 on one of the mechanical arm devices 19 adsorbs a side of the color filter substrate, and the suction device 21 on another mechanical arm device 19 adsorbs a side of the array substrate. The heating device 13 initials and begins to preheat. When the heating device 13 is preheated for a period of time (for example, after being preheated for 10 seconds), the mechanical arm devices 19 moves so as to move the display panel to the heating device 13. The heating device 13 heats up the display panel by a heating temperature in a range of 150° C. to 380° C., so that the sealant 28 in the display panel is subjected to a high temperature and thus being softened.

Figure 5:
FIG. 5 is a schematic view of a positional relationship between the dismantling blade and the display panel in the embodiment of present disclosure.

As shown in FIG. 5, the dismantling blade 14 contacts the sealant 28 in the display panel. Specifically, the dismantling blade 14 is located at a step of the display panel, that is, at a corner of the display panel. A length of the array substrate at the corner of the display panel is greater than a length of the color filter substrate, therefore further facilitating the dismantling blade to dismantle the display panel into the array substrate and the color filter substrate. The mechanical arm device 19 is moved under control, so that the display panel moves with respect to the dismantling blade 14, thereby the dismantling blade 14 scratches across the sealant 28 until the sealant 28 at the side of the display panel is entirely cut off. When the sealant 28 at the side of the display panel is cut off, the mechanical arm device 19 moves again so that the sealant 28 at uncut sides of the display panel are in contact with the dismantling blade 14. Then the above-mentioned cutting process for the sealant 28 is repeated until the sealants 28 at all sides of the display panel are all cut off by the dismantling blade 14. Then the heating device 13 is turned off, the two mechanical arm devices 19 are moved by a certain distance in opposite directions, so that the color filter substrate and the array substrate are separated from each other. When the color filter substrate and the array substrate are separated from each other, the two mechanical arm devices 19 rest for a certain period, for example, the two mechanical arm devices 19 rest for 5 minutes, waiting for cooling of the heating device 13. The spray device 16 moves until it is between the dismantled color filter substrate and the array substrate, and sprays cleaning liquid toward the color filter substrate and the array substrate to perform cleaning. The cleaning liquid includes absolute ethanol or deionized water. The spray device 16 firstly sprays absolute ethanol to clean off the liquid crystal on surfaces of the color filter substrate and the array substrate. Then when the surfaces of the color filter substrate and the array substrate are covered with the absolute ethanol for a certain period (for example, after the absolute ethanol covers the surfaces of the color filter substrate and the array substrate for 10 seconds), the spray device 16 then sprays deionized water for a certain period (for example, the spray device 16 then sprays deionized water for 10 seconds) so as to clean off the liquid crystal and absolute ethanol remained on the color filter substrate and the array substrate. The spray device 16 may also spray air to blow off the bulk liquid drop on the color filter substrate and the array substrate from the color filter substrate and the array substrate. Subsequently, the spray device 16 is turned off, and the drying device 17 is turned on. The drying device 17 may blow hot air to dry an interior of the housing 10, so that a part of the cleaning liquid may be evaporated and the cleaning liquid within the housing 10 may be pushed to the drain port 15 by air force to discharge the cleaning liquid from the drain port 15. The mechanical arm devices 19 are moved, so that the dismantled color filter substrate and array substrate are moved to the first panel placement zone 11 and the second panel placement zone 12 respectively. The suction device 21 is controlled to place the color filter substrate and the array substrate at the first panel placement zone 11 and the second panel placement zone 12 respectively, the entire process of dismantling and cleaning the display panel ends. The subsequent staff could take out the dismantled and cleaned color filter substrate and array substrate and analyze the same, then find out the reason why the defect occurs in the display panel.

An apparatus for dismantling and cleaning a display panel provided by the embodiment of present disclosure includes a housing 10. A first panel placement zone 11, a second panel placement zone 12, a heating device 13, a dismantling blade 14, a drain port 15, a spray device 16, a drying device 17, mechanical arm device 19 and a suction device 21 are provided within the housing 10. The embodiment of present disclosure provides an apparatus for dismantling and cleaning a display panel, wherein, the suction device 21 may adsorb the display panel, the mechanical arm device 19 moves the display panel to a suitable place, the heating device 13 softens the sealant in the display panel by a high temperature, the dismantling blade 14 dismantles the display panel into a color filter substrate and an array substrate, and the spray device 16 sprays cleaning liquid toward the dismantled color filter substrate and array substrate, so as to clean off the liquid crystal on the color filter substrate and the array substrate, the drying device 17 dries the interior of the housing. The entire process of dismantling and cleaning the display panel is completed by the apparatus for dismantling and cleaning the display panel of the embodiment of present disclosure, rather than operators, thereby eliminating damages to the operators in the process of dismantling and cleaning a display panel. And it may also avoid a situation where a broken screen may occur during manually dismantling and cleaning the dismantled color filter substrate and array substrate by the operators. Furthermore, such a process of dismantling and cleaning a display panel is completed within the housing 10, wasted liquid in the dismantling and cleaning process (including liquid crystal and the mixture of absolute ethanol and deionized water) is discharged through the drain port 15 and processed, preventing liquid waste contamination.

Further, referring to FIGS. 1, 2, 3 and 4, the first panel placement zone 11 and the second panel placement zone 12 may be provided at both sides of the heating device 13. The first panel placement zone 11 and/or the second panel placement zone 12 are provided with a stopper structure for the display panel, the dismantled color filter substrate or array substrate. The stopper structure can secure and place the display panel, the dismantled color filter substrate or array substrate. For example, the stopper structure may be a groove or several surrounded blocky bumps. Since the display panels to be dismantled in the embodiment of present disclosure may be different in their sizes, the display panels are placed into the stopper structure so that one corner of the display panel abuts tightly against one corner of the stopper structure, thus facilitating the positional fixation of the display panel.

Specific components of the mechanical arm device 19 will be described in details in the following. The mechanical arm device 19 includes a rotating arm 22, a sliding arm 23 that is horizontally slidable, and a telescopic arm 24 that is vertically retractable 5. The sliding arm 23 is located at an inner top of the housing 10, and it is possible to achieve a function of the sliding arm 23 sliding at the inner top of the housing 10 by means of pulleys or other sliding structures mounted at two ends of the sliding arm 23. An upper end of the telescopic arm 24 is fixedly connected to the sliding arm 23, and a lower end of the telescopic arm 24 connects to the rotating arm 22 that is rotatable around the lower end of the telescopic arm 24. A suction device 21 is provided on the rotating arm 22. The suction device 21 is an example of the pick-up device, and may be replaced by a device in other form that may be used on the display panel.

In the following, a description about a method for operating each of the components of the mechanical arm device 19 during the process of dismantling and cleaning the display panel will be described by taking FIG. 1 as an example. The display panel is placed at the first panel placement zone 11. When the mechanical arm device 19 and the suction device 21 are used to absorb the panel, the sliding arm 23 of the mechanical arm device 19 that is located at a left side, slides at the inner top of the housing 10 along an x-direction (i.e., the horizontal direction) to a point right above the first panel placement zone 11, and the rotating arm 22 rotates to be in a same line with the telescopic arm 24, the telescopic arm 24 extends so as to make the suction device 21 at the second end of the rotating arm 22 to contact the surface of the display panel, thus enabling the suction device 21 to absorb the display panel. Then, the telescopic arm 24 retracts, and the rotating arm 22 rotates to be orthogonal to the telescopic arm 24. The rotating arm 22 of the mechanical arm device 19 at a right side rotates to be orthogonal to the telescopic arm 24, the sliding arm 23 of the mechanical arm device 19 at the right side slides at the inner top of the housing 10 along the x-axis toward the mechanical arm device 19 at the left side, until the suction device 21 provided on the rotating arm 22 of the mechanical arm device 19 at the right side to contact and adsorb another surface of the display panel.

For example, the suction device 21 may be a vacuum chunk. Staffs often record defects on the surface of the display panel by a marker. For example, the vacuum chunk can cover marks on the display panel recorded by the marker, thereby preventing the marks on the display panel recorded by the marker from being washed away during the cleaning process. In the process of moving the panel onto the heating device 13 and dismantling the same by the mechanical arm device 19, the sliding arm 23 of the mechanical arm device 19 at the left side and the sliding arm 23 of the mechanical arm device 19 at the right side move synchronously, until the sealant 28 at one lowermost side of the display panel absorbed by the suction devices 21 of the two mechanical arm devices 19 contacts the dismantling blade 14. The two mechanical arm devices 19 move synchronously along a z-direction, so that the dismantling blade 14 cuts all sealant 28 at a side of the display panel. After the sealant 28 at the side of the display panel is cut off, the rotating arm 22 of the mechanical arm device 19 at the left side and the rotating arm 22 of the mechanical arm device 19 at the right side rotate synchronously, so that the display panel is rotated in the y-direction (i.e., the vertical direction) by 90°, and a side with the sealant 28 uncut yet is rotated to the lowermost. The two mechanical arm devices 19 move along the z-direction, the dismantling blade 14 cuts the sealant 28 at this side, and so on, until the dismantling blade 14 dismantles the sealant 28 at all of the four sides of the display panel. Then, the sliding arms 23 of the mechanical arm device 19 at the left and right sides move in opposite directions, to dismantle the display panel into a color filter substrate and an array substrate. After the operation of cleaning, drying the dismantled color filter substrate, the sliding arms 23 of the mechanical arm device 19 at the left and right sides slide till right above the first panel placement zone 11 and the second panel placement zone 12 respectively. The rotating arms 22 of the two mechanical arm devices 19 rotate synchronously to be at a same straight line with the telescopic arm 24, the telescopic arm 24 extends until the color filter substrate and the array substrate contact the first panel placement zone 11 and the second panel placement zone 12 respectively. Then the suction device 21 is turned off, so that the color filter substrate and the array substrate are placed at the first panel placement zone 11 and the second panel placement zone 12 respectively.

When the dismantling blade 14 cuts the sealant 28, the heating device 13 needs to supply heat to the display panel to soften the sealant 28 in the display panel, so as to facilitate the dismantling blade 14 to dismantle the display panel. For example, the heating device 13 includes a heating module and an air supply module. The heating module provides a high temperature, and in particular, a temperature range may be from 150° C. to 380° C. The air supply module provides wind. This is, the heating module and the air supply module are configured to operate together to provide hot air for softening the sealant 28 in the display panel.

When the display panel is dismantled into separated color filter substrate and array substrate, the spray device 16 needs to clean the color filter substrate and array substrate. Specific components of the spray device 16 will be described hereafter. The spray device 16 includes a lifting lever 25 and a connecting rod 26 within the housing 10. The lifting lever 25 is coupled to the connecting rod 26 that is provided with nozzles 27. The nozzles 27 are opposite to two surfaces of the color filter substrate and the array substrate. For example, the number of the spray nozzle 27 is two, and the two nozzles 27 spray liquid in opposite directions. That is, one spray nozzle 27 is opposite to a surface of the color filter substrate, and the other spray nozzle 27 is opposite to a surface of the array substrate. The spray device 16 is also connected to a feed pipe 18. The feed pipe 18 is configured to feed cleaning liquid or air to the spray device.

Steps of cleaning the color filter substrate and array substrate by the spray device 16 will be explained in the following. When the spray device 16 cleans the dismantled color filter substrate and array substrate, the lifting lever 25 ascends or descends in the y-direction to a position where the spray nozzle 27 is in parallel with a uppermost side of the color filter substrate or array substrate, the feed pipe 18 that is coupled to the spraying system provides cleaning liquid, and the cleaning liquid is sprayed from the nozzle 27 onto a departing surface of the color filter substrate and the array substrate, the lifting lever 25 ascends and descends in the y-direction, so that the cleaning liquid can cover the entire surfaces of the color filter substrate and array substrate. Furthermore, the nozzle 27 of the spray device 16 can also spray air to blow off bulky liquid drops from the entire surfaces of the color filter substrate and array substrate, so as to make preparations for subsequent drying process. Specific operation procedures of the spray device 16 spraying air are essentially identical to those of spraying cleaning liquid, the description of which is omitted herein. If the display panel has a larger size, the mechanical arm device 19 may also cooperate to move the color filter substrate and the array substrate, so that the cleaning liquid or air can cover the entire surfaces of the color filter substrate and the array substrate.

After the cleaning of the separated color filter substrate and array substrate is finished, the color filter substrate and the array substrate are subjected to drying. For example, the drying device 17 may be provided at an inner side of the housing 10. For example, the drying device 17 may be an ionic blower apparatus. The ionic blower apparatus may blow out hot air so as to evaporate small liquid drops on the color filter substrate and the array substrate as well as a part of the cleaning liquid flew onto the inner bottom of the housing 10, and it is also possible to push non-evaporated cleaning liquid and liquid crystal at the inner bottom of the housing 10 to the drain port 15 by means of air force. It should be noted that, the drain port 15 is located at a bottom corner of the housing 10 away from the drying device 17, so that it is convenient for the air force produced by the drying device 17 to push the non-evaporated cleaning liquid and liquid crystal to the drain port 15 and discharge the same.

An exhaust unit 20 may also be arranged at a top of the housing 10 of the above-mentioned apparatus for dismantling and cleaning a display panel. After the dismantled color filter substrate and array substrate have been dried, the exhaust unit 20 can push out the gas produced during the evaporation of the cleaning liquid in the housing 10 and even wasted gas produced when the sealant 28 is melted. For example, the exhaust unit 20 includes exhaust holes provided at the top of the housing 10 and a vacuum pressure aspiration apparatus in communication with the exhaust holes, to ensure a complete push-out of the waste gas from the housing 10 and thus prevent wasted gas contamination.

Figure 6:
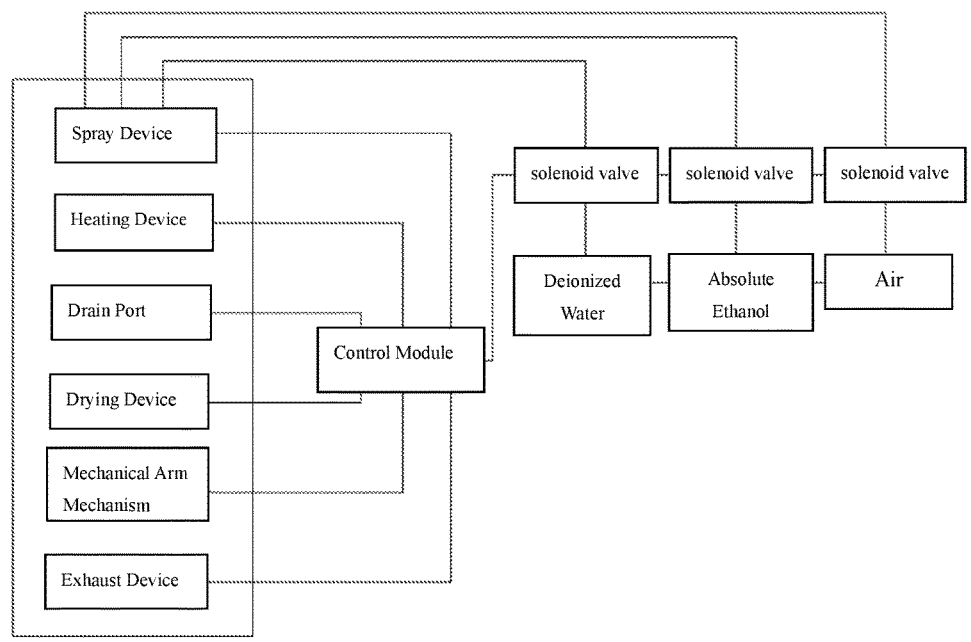
FIG. 6 is a structural schematic view of the apparatus for dismantling and cleaning the display panel and its external devices in the embodiment of present disclosure.

Furthermore, referring to FIGS. 1 and 6, the spray device 16 is connected to one end of the feed pipe 18. The other end of the feed pipe 18 may be connected to one end of the solenoid valve. The other end of the solenoid valve may be coupled with a storage device for receiving deionized water, absolute ethanol or air. The air may be supplied by an air pump. A control module may also be provided to control the spray device 16, the heating device 13, the drain port 15, the drying device 17, the mechanical arm device 19, the exhaust unit 20 and the like. The control module may also control a switch of the solenoid valve, so that specific material that is fed into the spray device 16 of the housing 10 by the feed pipe 18 can be determined. The drain port 15 may be also connected to a wasted fluid storage tank and a wasted fluid replacing device.

What are described above is related to the illustrative embodiments of the disclosure only and not limitative to the scope of the disclosure; the scopes of the disclosure are defined by the accompanying claims.

The present application claims priority of the Chinese patent application No. 201510552024.2 filed on Sep. 1, 2015, the disclosure of which is incorporated herein by reference in its entirety as part of the present application.

What is claimed is:

1. An apparatus for dismantling and cleaning, comprising a housing, wherein,
   a heating device for heating an object for dismantling and cleaning is provided in the housing;
   a movable mechanical arm device is provided in the housing, a pick-up device is provided on the mechanical arm device, and the pick-up device is configured to pick up the object for dismantling and cleaning; and
   a spray device configured to spray cleaning liquid and a drying device configured to dry an interior of the housing are provided within the housing,
   wherein the spray device comprises a lifting lever and a connecting rod provided within the housing, the lifting lever is coupled to the connecting rod, and the connecting rod is provided with a nozzle.

2. The apparatus for dismantling and cleaning according to claim 1, wherein the mechanical arm device comprises a rotating arm, a sliding arm that is horizontally slidable, and a telescopic arm that is vertically retractable, wherein,
   the sliding arm is provided at an inner top of the housing, an upper end of the telescopic arm is fixedly connected to the sliding arm, a lower end of the telescopic arm is connected to the rotating arm that is rotatable around the lower end of the telescopic arm, and the pick-up device is provided on the rotating arm.

3. The apparatus for dismantling and cleaning according to claim 2, wherein the pick-up device is a suction device.

4. The apparatus for dismantling and cleaning according to claim 3, wherein the suction device is a vacuum chunk.

5. The apparatus for dismantling and cleaning according to claim 1, wherein two nozzles are provided on the connecting rod, and the two nozzles are configured to spray liquid in opposite directions.

6. The apparatus for dismantling and cleaning according to claim 1, wherein the heating device comprises a heating module and an air supply module, and the heating module and the air supply module are configured to operate together to provide hot air.

7. The apparatus for dismantling and cleaning according to claim 1, wherein the drying device is installed on an inner side of the housing, and the drying device is an ionic blower apparatus.

8. The apparatus for dismantling and cleaning according to claim 1, wherein, a liquid pick-up device is provided within the housing or a drain port is provided within the housing.

9. The apparatus for dismantling and cleaning according to claim 8, wherein the drain port is provided at a corner of a bottom of the housing away from the drying device.

10. The apparatus for dismantling and cleaning according to claim 1, wherein a top of the housing is also provided with an exhaust unit, the exhaust unit comprises an exhaust hole, provided at the top of the housing, and a vacuum pressure aspiration apparatus in communication with the exhaust hole.

11. The apparatus for dismantling and cleaning according to claim 1, wherein the pick-up device is a suction device.

12. The apparatus for dismantling and cleaning according to claim 11, wherein the suction device is a vacuum chunk.

13. The apparatus for dismantling and cleaning according to claim 1, wherein a first panel placement zone and a second panel placement zone, for placing the object for dismantling and cleaning, are provided on an inner bottom of the housing, and a stopper structure is provided in the first panel placement zone and/or the second panel placement zone.

14. The apparatus for dismantling and cleaning according to claim 1, wherein a dismantling blade is provided on the heating device.

15. The apparatus for dismantling and cleaning according to claim 1, wherein two or more movable mechanical arm devices are provided in the housing, and each of the movable mechanical arm devices is provided with a corresponding pick-up device thereon.

16. The apparatus for dismantling and cleaning according to claim 1, wherein the object for dismantling and cleaning comprises a display panel, an array substrate after dismantling, or a color filter substrate after dismantling.

* * * * *